United States Patent [19]

McClure et al.

[11] Patent Number: 5,916,122
[45] Date of Patent: Jun. 29, 1999

[54] SOLIDIFICATION OF AQUEOUS WASTE

[75] Inventors: Alan D. McClure, Harrison; Yuji Noma, Signal Mountain, both of Tenn.

[73] Assignee: NA Industries, Inc., Chattanooga, Tenn.

[21] Appl. No.: 08/918,814

[22] Filed: Aug. 26, 1997

[51] Int. Cl.$^6$ .................................................. A62D 3/00
[52] U.S. Cl. ........................ 588/255; 210/901; 405/128; 405/129; 588/252; 588/259
[58] Field of Search ............................ 588/8, 9, 20, 249, 588/252, 255, 259; 405/128, 129, 270; 210/901

[56] References Cited

U.S. PATENT DOCUMENTS

| | | |
|---|---|---|
| 4,077,901 | 3/1978 | Arnold et al. . |
| 4,119,560 | 10/1978 | Sheeline . |
| 4,134,863 | 1/1979 | Fanta et al. . |
| 4,156,658 | 5/1979 | Mercer, Jr. et al. ................. 405/128 X |
| 4,382,026 | 5/1983 | Drake et al. .................................. 588/8 |
| 4,405,512 | 9/1983 | Filter et al. .................................. 588/8 |
| 4,427,836 | 1/1984 | Kowalski et al. . |
| 4,468,498 | 8/1984 | Kowalski et al. . |
| 4,530,723 | 7/1985 | Smeltzer . |
| 4,790,688 | 12/1988 | Castor . |
| 5,304,707 | 4/1994 | Blankenship et al. . |
| 5,368,412 | 11/1994 | Johnston et al. ......................... 405/128 |
| 5,385,105 | 1/1995 | Withers, Jr. et al. ................ 558/249 X |
| 5,391,597 | 2/1995 | Davies et al. ........................ 405/264 X |
| 5,732,363 | 3/1998 | Suzuki et al. ........................ 588/255 X |
| 5,862,494 | 1/1999 | McDonnell et al. ................. 588/255 X |

OTHER PUBLICATIONS

*Hawley's Condensed Chemical Dictionary*, Twelfth Edition, Van Nostrand Reinhold Company, New York, 1993, p. 200.

*Primary Examiner*—George Suchfield
*Attorney, Agent, or Firm*—Miller & Martin LLP

[57] ABSTRACT

This invention involves the solidification of aqueous waste with neutralized cross-linked polyacrylates prior to landfill disposal and to further minimize leachate treatment from landfills through the direct application of a neutralized cross-linked polyacrylate throughout the land filling and disposal process.

20 Claims, No Drawings

SOLIDIFICATION OF AQUEOUS WASTE

This invention relates to a method of solidification for aqueous waste materials. The invention contemplates the use of neutralized cross-linked polyacrylates in order to solidify aqueous waste intended for ultimate disposal in landfills. The invention also relates to a method of utilizing the same neutralized cross-linked polyacrylates for minimizing leachate from landfills.

BACKGROUND OF THE INVENTION

Processes for solidifying waste are known in the art. The most common treatments for aqueous waste are either to process the aqueous waste at a waste water treatment plant so that the water can be purified, or mixing the aqueous waste water with quick lime (kiln dust) on approximately a 1:1 ratio by weight to solidify the waste. Cement ash is also used in place of quick lime in some applications. Because the absorption and solidification of aqueous waste by quick lime or cement ash may take several days, and because the mixture of solidifying agents with aqueous waste on a 1:1 ratio substantially increases the weight of the waste to be disposed of at a landfill, thereby increasing the landfill tipping cost, many attempts have been made to improve the processes for solidifying aqueous waste.

For instance, U.S. Pat. No. 4,077,901 discloses a method for encapsulating liquid of finely divided solid waste by uniformly dispersing the waste into a liquid thermosettable polymer composition and thereafter curing the waste/polymer under thermal and catalytic conditions. U.S. Pat. No. 4,119,560 discloses that the use of sodium sulfate, portland cement, and urea-formaldehyde are known agents used in solidifying liquid waste.

U.S. Pat. No. 4,530,723 teaches a method of encapsulation of ion exchange resins by mixing with (1) boric acid or nitrate or sulfate salts, (2) a fouling agent and a base accelerator, and (3) cement.

U.S. Pat. No. 5,304,707 describes a method for solidification of waste containing water using core shell polymer particles which are neutralized with a base to cause swelling and encapsulation of liquid waste materials subsequent to the neutralization process.

U.S. Pat. No. 4,790,688 illustrates a technique to seal leaking landfill structures by utilizing a hydraulic fracturing technique to inject a mixture of a propant, a polymer, and a gelling or polymer cross-linking agent. None of these efforts have proved completely satisfactory.

OBJECT OF THE INVENTION

It is therefore an object of the present invention to provide an improved method of solidifying aqueous waste and for minimizing leachate from landfills.

It is a further object of this invention to improve the solidification of aqueous waste by utilizing cross-linked polymeric particles that have been neutralized during the formation process so that the solidification of aqueous waste can occur without the need for base neutralization at the desired time of solidification.

It is yet another object of this invention to increase the margin of safety found in current solidification processes through the selective replacement of the primary material utilized today, quick lime, which is classified as a corrosive, with a neutralized cross-linked polyacrylate which is non-corrosive material.

It is yet a further object of the invention to reduce the waste tonnage and transportation cost associated with landfill disposal through the use of neutralized cross-linked polyacrylates which will readily absorb at a ratio of up to 100 parts of aqueous waste water for each part of the neutralized cross-linked polyacrylate by weight. It is also a further object of the invention to reduce the handling and solidification time for aqueous waste and thereby reduce the operating cost associated with aqueous waste water disposal.

Finally, it is another object of the invention to minimize the leachate released by a landfill by applying neutralized cross-linked polyacrylates during the regular disposal of waste materials in each cell of the landfill.

DETAILED DESCRIPTION OF THE INVENTION

The current process for aqueous waste water treatment involves either the filtering and purification of the waste water so that the water may be safely returned to the environment or the solidification of the waste water for disposal at a landfill site. The typical landfill site for disposal of solidified aqueous waste is referred to as a Subtitle "D" Landfill, which is described in Subtitle D of the Resource Conservation and Recovery Act ("RCRA"). In order to dispose of waste at a Subtitle "D" Landfill, there must be no free liquids in the waste. Waste must pass a test referred to as the "paint filter test" in order to qualify for disposal at a Subtitle "D" Landfill. This paint filter test is described in EPA Publication SW-846 as Method 9095, and is the method utilized under the RCRA to determine whether there are free liquids in waste.

Some types of aqueous waste are particularly difficult to process by filtration and subsequent purification of the water for release into the environment. Particularly, latex waste water is a common industrial by-product and is known to foul filtering equipment. Such aqueous waste is now generally placed into a mixing lagoon, vessel, tank, or other containment device with an impermeable barrier to prevent leakage of the waste to the environment. Typical mixing tanks would hold from between 1,000 to 5,000 gallons of aqueous waste. A typical method of disposing of aqueous waste water at present would be to place 20,000 pounds of aqueous waste water (approximately 3,000 gallons) into the mixing tank together with 20,000 pounds of quick lime or cement ash. The mixture would be stirred using a mechanical means such as a backhoe or other suitable mixing device, and left to set. After approximately three days the mixture in the tank would be set and could be loaded into trucks for transport to a landfill. The weight of the solid waste would be approximately 40,000 pounds and transportation and landfill tonnage fees would be assessed on that weight.

Utilizing the neutralized cross-linked polyacrylates of the present invention will allow the solidification of aqueous waste within minutes or hours, depending upon the ratio of neutralized cross-linked polyacrylate utilized with respect to the aqueous waste, and the composition of the aqueous waste. The neutralized cross-linked polyacrylates of the present invention are not intended for use on heavy organic waste streams, but are intended for use on aqueous waste containing at least 90% water by weight. Such aqueous waste would typically consist of latex water or chemically contaminated storm water, either type of water also possibly containing glues and adhesives. The neutralized cross-linked polyacrylates also would not operate in the presence of extraordinarily high concentrations of sodium chloride or sodium nitrate. These concentrations are unlikely to be seen in the usual aqueous waste streams, and the levels of sodium chloride and sodium nitrate encountered would typically only slow the solidification process slightly.

Neutralized cross-linked polyacrylates according to the present invention will preferably comprise sodium polyacrylate, although calcium polyacrylate and potassium polyacrylate should produce comparable results. Current field testing of the present invention has involved the mixture of approximately 40,000 pounds of aqueous waste with 2,000 pounds of sodium polyacrylate. The aqueous waste has been composed of a variety of industrial waste waters typically referred to as latex water. After stirring, the aqueous waste has usually solidified in less than thirty minutes. Thus, it will be realized that the mixing lagoons can be utilized repeatedly in a single day to solidify aqueous waste. Furthermore, it is apparent that the ratio of the weight of the solidifying agent to the weight of the aqueous waste is 1:20, a vast improvement over the 1:1 ratio that would be anticipated with quick lime or cement ash. Therefore, the transportation and landfill tonnage fees are assessed only on the aggregate weight of 42,000 pounds rather than the 80,000 pounds that would be anticipated with the use of quick lime or cement ash employed to dispose of the same 40,000 pounds of aqueous waste. It is anticipated that as the technique of utilizing neutralized cross-linked polyacrylates is refined, that ratios of one part by weight of sodium polyacrylate to 100 parts by weight of aqueous waste will be typical in some instances. The following laboratory examples demonstrate the solidification capabilities of sodium acrylate.

EXAMPLE 1

One hundred grams (100 gr.) of sodium polyacrylate was added to one thousand grams (1,000 gr.) of deionized water. The aqueous fraction was absorbed in thirty and four tenths seconds (30.4 s.) so that the overall material would pass the paint filter test. The overall weight of the combined materials was one thousand and one hundred grams (1,100 gr.).

EXAMPLE 2

Ten grams (10 gr.) of sodium polyacrylate was added to one thousand grams (1,000 gr.) of deionized water. The sodium polyacrylate adsorbed the aqueous fraction in two minutes and forty-five seconds (2 m. 45 s.) so that the overall material would pass the paint filter test. Overall weight of the combined materials was one thousand and ten grams (1,010 gr.).

EXAMPLE 3

Five grams (5 gr.) of sodium polyacrylate was added to one thousand grams (1,000 gr.) of deionized water. The aqueous fraction was adsorbed in five minutes and forty-five seconds (5 m. 45 s.) so that the overall material would pass the paint filter test. The overall weight of the combined materials was one thousand and five grams (1,005 gr.).

EXAMPLE 4

One hundred grams (100 gr.) of sodium polyacrylate was added to one thousand grams (1,000 gr.) of contaminated latex water. The latex contamination was in the range of one to seven percent (1%–7%). The aqueous fraction was adsorbed in fifteen minutes and twenty-one seconds (15 m. 21 s.) so that the overall material would pass the paint filter test. The overall weight of the combined materials was one thousand and one hundred grams (1,100 gr.).

EXAMPLE 5

One hundred grams (100 gr.) of sodium polyacrylate was added to one thousand grams (1,000 gr.) of synthetic urea. The synthetic urea has a composition of two percent (2%) urea, one percent (1%) sodium chloride, one-tenth of a percent (0.1%) magnesium sulfate, and one-tenth of a percent (0.1%) calcium chloride. The aqueous fraction was adsorbed in one minute and twenty-eight seconds (1 m. 28 s.) so that the overall material would pass the paint filter test. The overall weight of the combined materials was one thousand and one hundred grams (1,100 gr.).

It is evident that the use of neutralized cross-linked polyacrylates is superior to the current methods utilized for solidification of aqueous waste. Such methods include the use of materials such as cement ash, concrete, oil-dry, corn husks, and vermiculite in addition to the previously mentioned quick lime. Neutralized cross-linked polyacrylates can be used in weight ratios of 1:100 or even 1:1000 to the weight of the aqueous waste in appropriate circumstances. In commercial use, it is generally anticipated that weight ratios of neutralized cross-linked polyacrylates to aqueous waste will range from a low of about 1:3 to a high of 1:200, depending upon the composition of the aqueous waste and whether the waste needs to be solidified in a few minutes or overnight (approximately 12–16 hours).

Not only does the use of neutralized cross-linked polyacrylates save time and expense in processing aqueous waste for disposition at a landfill site, but it may also significantly decrease the possibility of leachate being released from a landfill. Landfills must generally be constructed with bottom and side walls that are impervious to leakage. Generally, landfills employ a combination of a clay base, geotextile and plastic sheetings to arrest the downward leaching of aqueous waste materials. If the containing base and side walls are breached, it becomes very expensive to either remove, solidify, detoxify, or contain the waste. Utilizing neutralized cross-linked polyacrylates during the operation of the landfill may prevent or minimize subsequent leachate problems.

Specifically, over the life of a landfill, the daily deposits of waste are covered with an impermeable topping. Typically, the daily cover consists of a layer of fill dirt (clay) over a cell in which the day's waste has been deposited. Over the life of the landfill, the cells will cover the entire bottom surface of the landfill and additional layers of cells will be placed above. A typical daily cell might contain 2400 tons of waste. To prevent aqueous leachate, the neutralized cross-linked polyacrylates can be added to the waste and/or daily cover during the regular operation of the landfill. In this fashion, if leachate should develop in a landfill cell, it will be likely to be adsorbed and solidified by neutralized cross-linked polyacrylates before percolating into an adjacent cell and more certainly before flowing out of the landfill site. In the absence of gross mismanagement of a landfill site, it is believed unlikely that more than 50 tons of leachate would be generated in a given daily cell. Therefore, it is contemplated that the neutralized cross-linked polyacrylates would be utilized in amounts as low as about 1000–2000 pounds per cell. Obviously, this amount could be adjusted for larger cells or waste likely to produce more leachate. Preferably, the neutralized cross-linked polyacrylates are mixed with the fill dirt for application as part of the daily cover.

Numerous alterations of the methods herein described will suggest themselves to those skilled in the art. It will be understood that the details and arrangements of the methods that have been described and illustrated in order to explain the nature of the invention are not to be construed as any limitation of the invention, and all such alterations which do not depart from the spirit of invention are intended to be included within the scope of the intended claims.

We claim:

1. A method for solidifying aqueous waste comprising:
exposing a quantity of aqueous waste having a first weight to a neutralized cross-linked poly-acrylate having a second weight and thereby solidifying said aqueous waste in less than about 12 hours such that there are no free liquids, wherein the ratio of the first weight to the second weight is at least about 3:1.

2. The method of claim 1 wherein the aqueous waste is leachate from a landfill.

3. The method of claim 1 wherein the aqueous waste is selected from the group consisting of latex water, contaminated storm water, and aqueous solutions of glues and adhesives.

4. The method of claim 1 wherein the aqueous waste is solidified in less than about 1 hour.

5. The method of claim 1 wherein the ratio of the first weight to the second weight is between about 3:1 and about 200:1.

6. The method of claim 1 wherein the ratio of the first weight to the second weight is between about 10:1 and about 100:1.

7. The method of claim 1 wherein the neutralized cross-linked polyacrylate is selected from the group consisting of sodium polyacrylate, potassium polyacrylate, and calcium polyacrylate.

8. A method for disposal of aqueous waste comprising the steps of:
(a) placing a quantity of aqueous waste in a containment vessel, said aqueous waste having a first weight;
(b) placing a quantity of neutralized cross-linked polyacrylates in said containment vessel, said neutralized cross-linked polyacrylates having a second weight;
(c) optionally stirring the aqueous waste and neutral and cross-linked polyacrylates;
(d) waiting a sufficient time for the neutralized cross-linked polyacrylates to solidify the aqueous waste sufficiently that there are no free liquids;
(e) transporting the solidified aqueous waste to a landfill for disposal.

9. The method of claim 8 wherein the aqueous waste is selected from the group consisting of latex water, contaminated storm water, and aqueous solutions of glues and adhesives.

10. The method of claim 8 wherein the time in step (d) is no more than 12 hours.

11. The method of claim 8 wherein the time in step (d) is no more than 1 hour.

12. The method of claim 8 wherein the ratio of the first weight to the second weight is between about 3:1 and about 200:1.

13. The method of claim 8 wherein the ratio of the first weight to the second weight is between about 10:1 and 50:1.

14. The method of claim 8 wherein the neutralized cross-linked polyacrylate is selected from the group consisting of sodium polyacrylate, potassium polyacrylate, and calcium polyacrylate.

15. The method of claim 8 wherein the landfill is a subtitle "D" landfill.

16. A method of solidifying aqueous waste in the form of leachate within a landfill comprising the steps of:
(a) depositing a day's waste having a first weight in the landfill;
(b) depositing neutralized cross-linked polyacrylates having a second weight in the landfill with the day's waste;
(c) waiting for leachate to develop and flow into contact with the neutralized cross-linked polyacrylates, whereby the neutralized cross-linked polyacrylates solidify the leachate such that there are no free liquids; and wherein the ratio of the first weight to the second weight is between about 1000:1 and about 10,000:1.

17. The method of claim 16 wherein the neutralized cross-linked polyacrylate is selected from the group consisting of sodium polyacrylate, potassium polyacrylate, and calcium polyacrylate.

18. The method of claim 16 wherein the ratio of the first weight to the second weight is between about 2000:1 and about 5000:1.

19. The method of claim 16 wherein the neutralized cross-linked polyacrylates are mixed with the day's waste.

20. The method of claim 16 wherein the neutralized cross-linked polyacrylates are placed over a day's waste together with a daily cover.

* * * * *